United States Patent
Reunamäki et al.

(10) Patent No.: US 10,681,335 B2
(45) Date of Patent: Jun. 9, 2020

(54) VIDEO RECORDING METHOD AND APPARATUS

(71) Applicant: Nokia Technologies Oy, Espoo (FI)

(72) Inventors: Jukka Reunamäki, Tampere (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/761,531

(22) PCT Filed: Sep. 23, 2015

(86) PCT No.: PCT/FI2015/050634
§ 371 (c)(1),
(2) Date: Mar. 20, 2018

(87) PCT Pub. No.: WO2017/051064
PCT Pub. Date: Mar. 30, 2017

(65) Prior Publication Data
US 2018/0343440 A1  Nov. 29, 2018

(51) Int. Cl.
*H04N 13/243* (2018.01)
*H04N 21/2343* (2011.01)
(Continued)

(52) U.S. Cl.
CPC ....... *H04N 13/243* (2018.05); *A63B 24/0021* (2013.01); *G01S 3/46* (2013.01);
(Continued)

(58) Field of Classification Search
CPC ............. H04N 13/243; H04N 5/23299; H04N 43/106; H04N 5/23206; H04N 5/23238;
(Continued)

(56) References Cited

U.S. PATENT DOCUMENTS 6,034,716 A   3/2000 Whiting et al.
6,337,683 B1  1/2002 Gilbert et al.
(Continued)

FOREIGN PATENT DOCUMENTS

EP   2150057 A2   2/2010
EP   2685707 A1   1/2014
(Continued)

OTHER PUBLICATIONS

"Bluetooth Specification V4.0", Specification of the Bluetooth system, Jun. 30, 2010, 2302 pages.
(Continued)

*Primary Examiner* — Mishawn N. Hunter
(74) *Attorney, Agent, or Firm* — Locke Lord LLP (57) ABSTRACT

A method and apparatus are disclosed for recording, at a recording apparatus, video content obtained from an array of cameras, wherein each camera records video content from a section of a recording area; receiving a wireless message from a tag situated in the recording area; applying a time stamp to the received wireless message; determining directional information of the tag in the recording area based on analysis of the wireless message; and causing the directional information and the timestamp to be stored.

21 Claims, 7 Drawing Sheets (51) Int. Cl.

| | | |
|---|---|---|
| *H04N 5/232* | (2006.01) | |
| *G11B 27/031* | (2006.01) | |
| *G01S 3/46* | (2006.01) | |
| *G11B 27/11* | (2006.01) | |
| *H04N 5/247* | (2006.01) | |
| *A63B 24/00* | (2006.01) | |
| *G06K 7/10* | (2006.01) | |
| *G11B 27/10* | (2006.01) | |
| *H04L 12/26* | (2006.01) | |
| *G03B 37/04* | (2006.01) | |

(52) U.S. Cl.
CPC ........ *G06K 7/10009* (2013.01); *G11B 27/031* (2013.01); *G11B 27/105* (2013.01); *G11B 27/11* (2013.01); *H04L 43/106* (2013.01); *H04N 5/23206* (2013.01); *H04N 5/23238* (2013.01); *H04N 5/23293* (2013.01); *H04N 5/23299* (2018.08); *H04N 5/247* (2013.01); *H04N 21/2343* (2013.01); *G03B 37/04* (2013.01)

(58) Field of Classification Search
CPC ............... H04N 5/23293; H04N 5/247; H04N 21/2343; G11B 27/031; G11B 27/105; G11B 27/11
See application file for complete search history.

(56) References Cited

U.S. PATENT DOCUMENTS

| 7,839,926 | B1 | 11/2010 | Metzger et al. | |
|---|---|---|---|---|
| 2005/0093976 | A1 | 5/2005 | Valleriano et al. | |
| 2010/0033371 | A1* | 2/2010 | Kumagai | G01C 11/02 342/357.31 |
| 2013/0148861 | A1 | 6/2013 | Ferlatte et al. | |
| 2013/0176403 | A1 | 7/2013 | Varga | |
| 2013/0271602 | A1 | 10/2013 | Bentley et al. | |
| 2013/0300832 | A1 | 11/2013 | Hohteri et al. | |
| 2014/0098185 | A1* | 4/2014 | Davari | H04N 5/23238 348/36 |
| 2015/0103197 | A1* | 4/2015 | Djordjevic | G06T 15/205 348/218.1 |
| 2015/0156423 | A1* | 6/2015 | Lundberg | H04N 5/23203 348/169 |
| 2015/0235064 | A1 | 8/2015 | Johannesen et al. | |
| 2016/0088287 | A1* | 3/2016 | Sadi | H04N 13/254 348/43 |

FOREIGN PATENT DOCUMENTS

| WO | 2001/095513 A1 | 12/2001 |
|---|---|---|
| WO | 2007/036842 A2 | 4/2007 |
| WO | 2010/105633 A1 | 9/2010 |
| WO | 2012/012781 A1 | 1/2012 |
| WO | 2013/069205 A1 | 5/2013 |
| WO | 2015/014773 A1 | 2/2015 |
| WO | 2015/107252 A1 | 7/2015 |

OTHER PUBLICATIONS

"InLocation Alliance", InLocation Alliance, Retrieved on Feb. 1, 2016, Webpage available at : http://www.in-location-alliance.com.
International Search Report and Written Opinion received for corresponding Patent Cooperation Treaty Application No. PCT/FI2015/050634, dated Feb. 2, 2016, 18 pages.
Belloni, "Bringing Navigation Indoors", GETA Winter School: Short course on Wireless Localization, Feb. 13-15, 2012, pp. 1-41.
Ochi et al., "A New Video Sharing by Communication and Analysis of Region of Interest on Panoramic Video", International Conference on Computing, Networking and Communications (ICNC), Jan. 28-31, 2013, pp. 660-664.
Kawano et al., "Community Based P2p Video Streaming Service by Networked Consumer Electronics", International Conference on Network-Based Information Systems (NBIS), Aug. 19-21, 2009, pp. 553-558.
"GoPro unveils a 360-degree camera array for VR videos", Engadget, Retrieved on Mar. 14, 2018, Webpage available at : https://www.engadget.com/2015/05/28/gopro-360-degree-camera-array-for-vr/.
Extended European Search Report received for corresponding European Patent Application No. 15904688.7, dated Apr. 8, 2019, 9 pages.

* cited by examiner

VIDEO RECORDING METHOD AND APPARATUS

RELATED APPLICATION

This application was originally filed as PCT Application No. PCT/FI2015/050634 filed Sep. 23, 2015.

FIELD

The specification relates to a video recording method and apparatus.

BACKGROUND

In the field of audio/video recording and editing it is often necessary to handle files that are relatively large in terms of data size. A particular issue arises where audio/video content is obtained from an array of recording devices leading to even greater quantities of data. This brings new challenges in relation to managing the large quantities of data in a reliable, efficient and user-friendly manner.

SUMMARY

In a first aspect, this specification describes a method comprising capturing, at a video capture apparatus, video content obtained from an array of cameras, wherein each camera is arranged to capture video content from a section of a recording area; receiving a wireless message from a tag situated in the recording area; applying a time stamp to the received wireless message; determining directional information of the tag in the recording area based on analysis of the wireless message; and causing the directional information and the timestamp to be stored.

The directional information may comprise angle of arrival information of the received wireless message.

The angle of arrival information may comprise an azimuthal angle.

The angle of arrival information may comprise an elevational angle.

The directional information and the timestamp may be stored at the video capture apparatus.

The directional information and the timestamp may be stored at a remote server.

The camera array may be a spherical array arranged to capture video content from a spherical recording area.

The wireless message may contain additional information input by a user of the tag.

The wireless message may contain a tag identifier identifying the tag from which the wireless message is received.

The timestamp may correspond to a time value of the video stream.

The wireless message may be a BLE advertisement packet.

The directional information and timestamp information may be stored in a file separate from the recorded video content.

The video content captured by each respective camera may be recorded as part of a composite data file or in an individual file.

The array of cameras may comprise a plurality of stereoscopic camera pairs.

In a second aspect, this specification describes a computer program comprising instructions that, when executed by a computing apparatus, cause the computing apparatus to perform the method of the first aspect.

In a third aspect, this specification describes an apparatus comprising at least one processor; at least one memory having computer-readable instructions stored thereon, the computer-readable instructions when executed by the at least one processor causing the apparatus at least to capture video content obtained from an array of cameras, wherein each camera is arranged to capture video content from a section of a recording area; receive a wireless message from a tag situated in the recording area; apply a time stamp to the received wireless message; determine directional information of the tag in the recording area based on analysis of the wireless message; and cause the directional information and the timestamp to be stored.

In a fourth aspect, this specification describes a computer-readable medium having computer-readable code stored thereon, the computer-readable code, when executed by at least one processor, causing performance of capturing, at a video capture apparatus, video content obtained from an array of cameras, wherein each camera is arranged to capture video content from a section of a recording area; receiving a wireless message from a tag situated in the recording area; applying a time stamp to the received wireless message; determining directional information of the tag in the recording area based on analysis of the wireless message; and causing the directional information and the timestamp to be stored.

In a fifth aspect, this specification describes an apparatus comprising means for capturing, at a video capture apparatus, video content obtained from an array of cameras, wherein each camera is arranged to capture video content from a section of a recording area; means for receiving a wireless message from a tag situated in the recording area; means for applying a time stamp to the received wireless message; means for determining directional information of the tag in the recording area based on analysis of the wireless message; and means for causing the directional information and the timestamp to be stored.

BRIEF DESCRIPTION OF THE DRAWINGS

For a more complete understanding of the methods, apparatuses and computer-readable instructions described herein, reference is now made to the following descriptions taken in connection with the accompanying drawings in which.

DETAILED DESCRIPTION

Embodiments of the invention provide a system for capturing video and/or audio across an array of recording devices as well as capturing directional data relating to positioning tags that are within the field of view of the recording devices. The directional data may be used during at least one of a subsequent video processing/editing stage so that multiple streams captured by the array of recording devices can be handled in an efficient way. Furthermore, when a video is subsequently viewed by a viewer, certain views may be highlighted as part of the video based on the relative location measured from the positioning tag's wireless transmissions.

Embodiments of the invention involve recording the relative locations of radio-detected objects and associating the locations with an area captured in the video and/or audio data. A record of the direction radio information may be added to a video and/or audio recording file. Alternatively, a separate file may be recorded containing the directional radio information and time-stamped so that it matches with the simultaneously recorded video and/or audio files.

Figure 1:
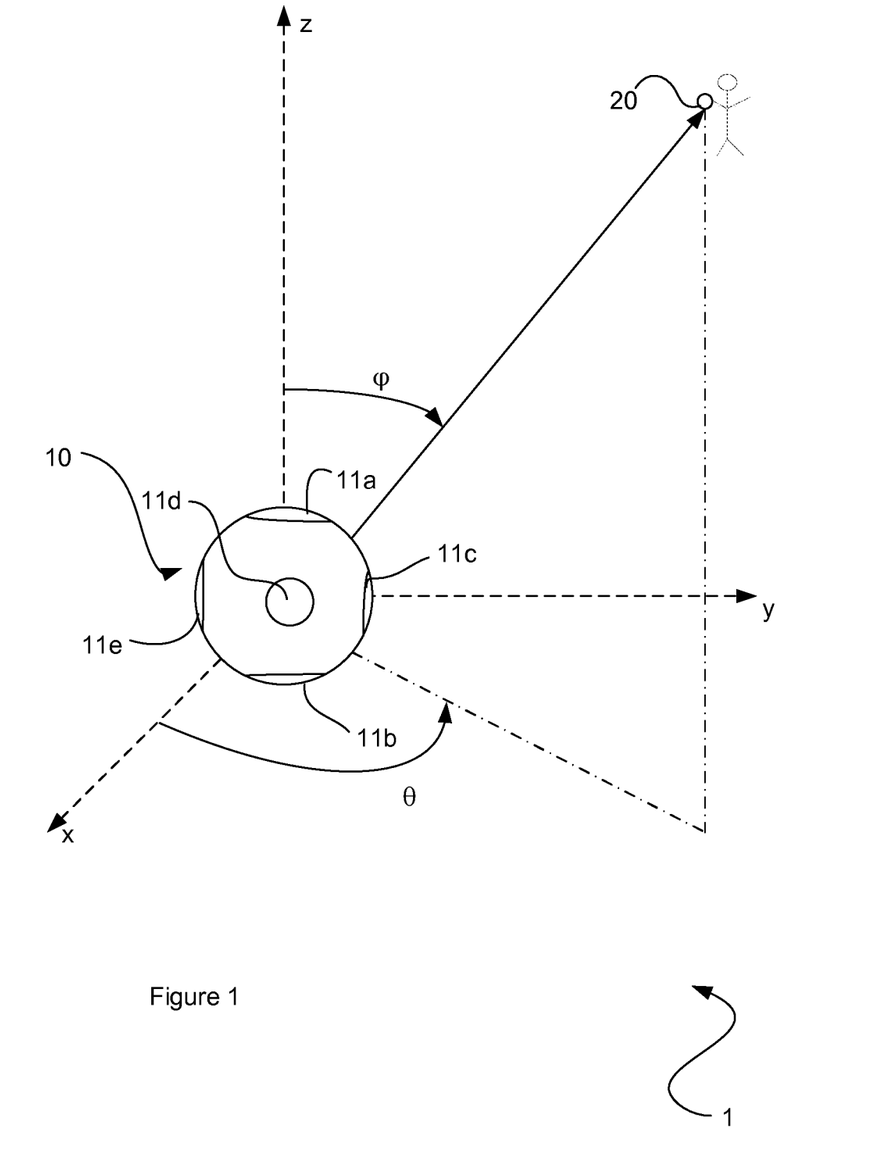
FIG. 1 illustrates a recording environment.

FIG. 1 shows an example recording environment 1. A recording apparatus 10 comprises a spherical array of video cameras 11 and a chassis. While referred to as a recording apparatus, the apparatus is arranged to capture a live video stream as well as recording video content to be stored at a storage medium. In embodiments, where the video content is stored, it can be stored at the recording apparatus itself, at a video editing computer or at a remote server. The video cameras 11 are arranged to provide video coverage across 360 degrees in terms of both elevation and azimuth, i.e. across an entire sphere, which may be termed a video sphere. It should be borne in mind that in alternative embodiments, an array may comprise cameras covering a hemispherical area or indeed only a section of a spherical area.

Each of the cameras 11 is arranged to capture a section of the three-dimensional space surrounding the camera array 10. The recording apparatus 10 shown in FIG. 1 has six cameras 11a-f. Camera 11f is not shown in FIG. 1 but is represented schematically in FIG. 2.

A positioning tag 20 (for example a Bluetooth Low Energy tag) is shown in FIG. 1. In this example, the positioning tag 20 is part of a user's watch. In other non-limiting examples the positioning tag 20 may be attached to an animal's collar to help capture video for a wildlife documentary or the positioning tag 20 may be incorporated in a mobile phone or a key fob.

The recording apparatus 10 and positioning tags 20 may be configured to operate using any suitable type of wireless transmission/reception technology. Suitable types of technology include, but are not limited to Bluetooth Basic Rate/Enhanced Data Rate (BR/EDR) and Bluetooth Low Energy (BLE). Bluetooth Low Energy (BLE) is a relatively new wireless communication technology published by the Bluetooth SIG as a component of Bluetooth Core Specification Version 4.0. Other types of suitable technology include for example technologies based on IEEE 802.11 and IEEE 802.15.4. The use of BLE may be particularly useful due to its relatively low energy consumption and because most mobile phones and other portable electronic devices will be capable of communicating using BLE technology.

Signals/positioning packets transmitted by the positioning tags 20 may be according to the High Accuracy Indoor Positioning (HAIP) solution for example as described at http://www.in-location-alliance.com.

Whilst embodiments are described herein using BLE messages and HAIP systems, alterative low-power radio technologies may be used such as IEEE 802.15.4.

The recording apparatus 10 may be considered the origin of a spherical coordinate system. The positioning tag 20 may thus be defined by an azimuthal angle θ in the x-y plane shown in FIG. 1 and by an elevational angle φ with respect to the z axis. As will be explained in more detail below, the positioning tag 20 periodically transmits wireless messages which are received by the recording apparatus 10. The recording apparatus 10 then determines an azimuthal angle of arrival and an elevational angle of arrival for the received packet. The recording apparatus 10 may also determine a received signal strength indication (RSSI) value for the received package. This information may then be stored in a suitable format.

Figure 2:
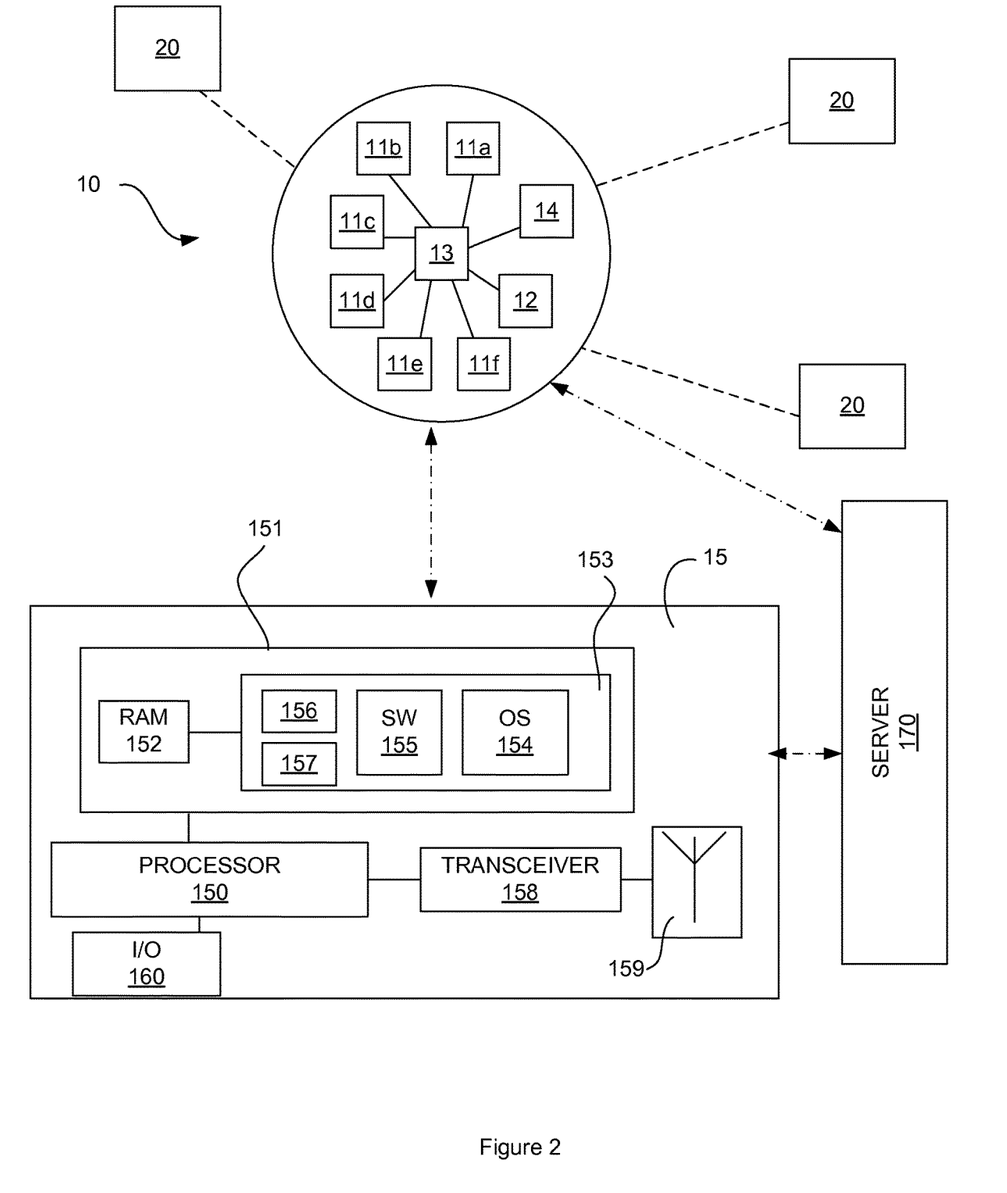
FIG. 2 is a schematic diagram illustrating a recording apparatus and an editing/replay apparatus.

FIG. 2 is a schematic diagram of the recording apparatus 10 and editing and/or replay apparatus 15. The recording apparatus 10 comprises a controller 13. The controller 13 controls the recording apparatus 10. The controller 13 is configured to determine angle-of-arrival information from packets received from the tags 20.

In the example implementation shown in FIG. 2, the controller 13 is mounted in the centre of the video/audio recording system. In this embodiment, there are six cameras, each having one lens, and a single controller 13. The output of the camera recording is saved into one or more files in raw or processed format stored by the controller 13. The output of each individual camera may be stored in a respective file stored by the controller 13. Alternatively, the output of the cameras may be combined into a single, composite file stored by the controller 13. Also, the directional data is saved into one or more files in a raw or processed format. The video and directional data may be stored locally at the recording apparatus 10 or separately, such as in a remote server 170, to be accessed remotely by the replay apparatus 15. Alternatively the recorded media and directional data may be uploaded to the replay apparatus 15 itself.

The recording apparatus 10 may comprise a communication module 14. The communication module 14 comprises an RF antenna and RF transceiver to allow wireless communication between the recording apparatus 10 and a remote server 170 or computer 15 having a video-editing capability. The recording apparatus 10 may be configured to communicate via a wireless network such as Wi-Fi. Alternatively, the recording apparatus 10 may have a wired link (not shown) to a computer having a video-editing capability.

The recording apparatus 10 may be provided with a user input/output 12. The user input/output 12 may comprise a screen and keyboard which may be integrated into a touchscreen. The user input/output 12 is used to allow the user to control the operation one or more of the cameras 11 and the playback functionality of the recording apparatus 10. The user input/output 12 allows the user to control playback from selected one or more cameras. As described below with reference to FIG. 7, a user may select one or more tags 20 from a user interface displayed on the screen of the apparatus 10. Selection of parts of the video content relevant to the tag location may then be performed at the apparatus 10.

The screen may be used for viewing live footage from one or more cameras. A user may select one or more tags 20 and view live footage from the cameras that are relevant to the selected tags. The selected video content may be stored at the apparatus 10, the replay apparatus 15 or the remote server 170.

The editing and/or replay apparatus 15 may be a computer comprising a processor 150 and a storage device 151. The storage device 151 comprises a volatile memory 152 and a non-volatile memory 153. The non-volatile memory 153 may have an operating system 154 and video editing software 155 stored therein. The non-volatile memory 153 may also store a directional data file 156 in which the directional data received from the controller 13 is stored. A video file 157 may also be stored containing video stream data received from the controller 13. Alternatively, the video file may be stored at the remote server 170. The video stream data may be stored as separate files, whereby each video file contains the output of each respective camera. Alternatively, the directional data may be contained within the video file(s). The editing and/or replay apparatus 15 further comprises an RF transceiver 158 and an RF antenna 159 to enable wireless communication with the, recording apparatus 10 and the server 170. The replay apparatus 15 may be a computer having input and output components 160 such as a screen, keyboard and speakers and so forth. A user may view video content from the recording apparatus as a live stream received from the recording apparatus 10. Alternatively, the video content may be stored at the replay apparatus 15 or the remote server 170 for playback.

Figure 3:
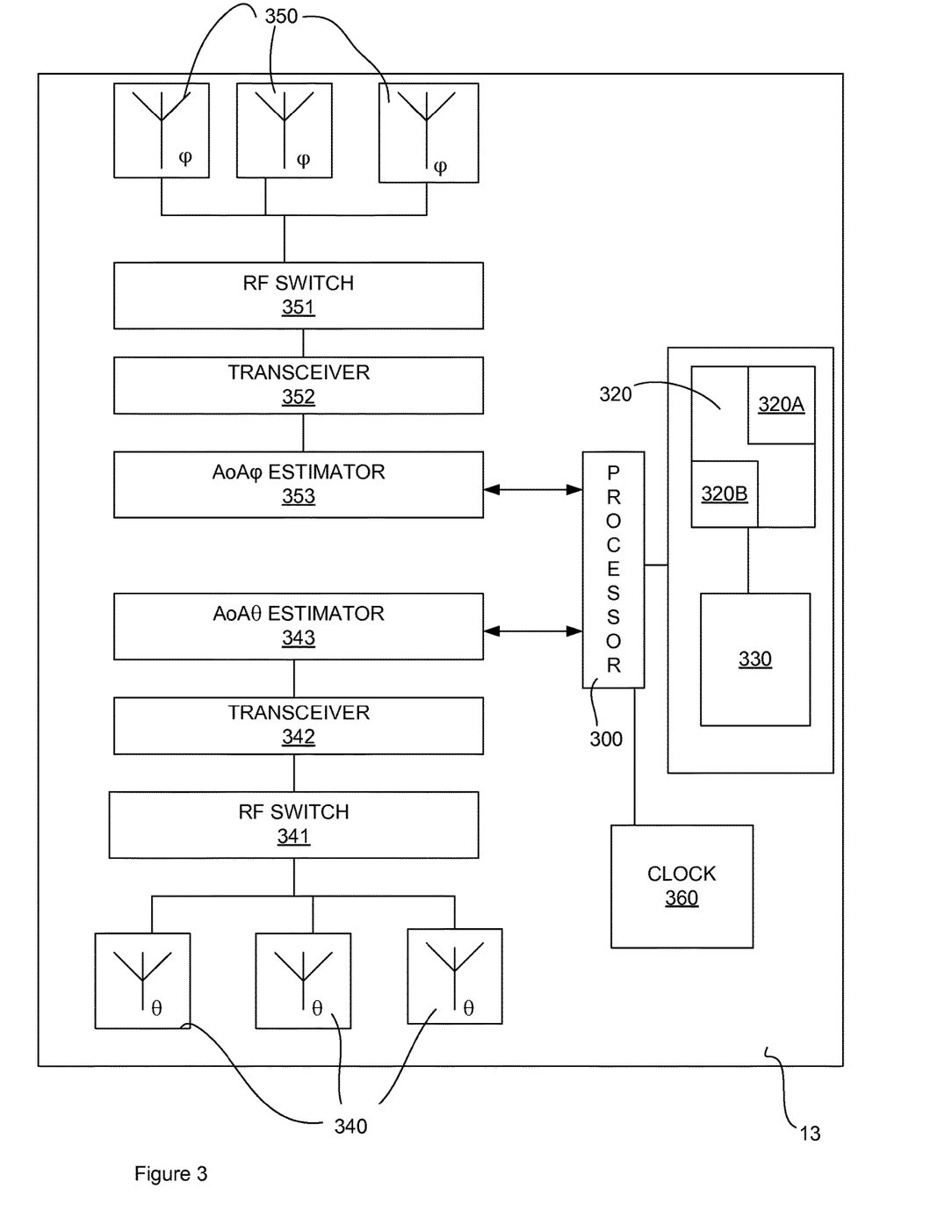
FIG. 3 is a schematic diagram of a controller.

FIG. 3 is an example schematic block diagram of the controller 13. The controller 13 comprises a processor 300 and storage device 310. The storage device 310 comprises non-volatile memory 320 on which computer-readable code 320A is stored. The non-volatile memory is provided with a Bluetooth module 320B. The computer-readable code 320A allows the particular functionality of the controller 13 in embodiments of the present invention to be stored and executed. The Bluetooth module 320B contains the code required so that received Bluetooth messages may be processed in accordance with the Bluetooth standard. The storage device 310 also comprises a volatile memory 330.

The processor 300 is arranged to process azimuthal and elevational angle-of-arrival information. The processor 300 may apply directional data to the video feed obtained from one or more cameras. Alternatively, the processor 300 may output the directional data and the video feed obtained from one or more cameras to a remote server.

The controller 13 comprises an azimuthal antenna array 340 connected to an RF switch 341, a transceiver 342 and an azimuthal angle-of-arrival (AoA) estimation module 343.

The controller 13 also comprises an elevational antenna array 350 connected to an RF switch 351, a transceiver 352 and an elevational angle-of-arrival (AoA) estimation module 353.

The estimation of the Angle of Arrival is based on a measured time difference of signal copies (transmitted by the multiple physically separated antennas) in the receiver. The time difference is due to variable propagation channel lengths, and the practical estimation is typically based on secondary effects to the signal, such as the resulting phase difference of the signal copies. Angle of Arrival positioning has been shown to provide positioning accuracy of tens of centimetres, or in about 2 degree direction estimate.

The link between the processor 300 and the antennas 340, 350 may be bidirectional so that the transceivers 342, 352 and antennas 340, 350 may also be used for RF communication.

The controller 13 also comprises a dock 360 and time-stamping capability. The controller 13 may be configured to measure and record RSSI data of received packets.

The controller 13 may store reference values to allow the azimuthal and elevational angles to be monitored uniformly. The storage device 310 may store information defining the bearing of zero degrees in azimuth and elevation. From these reference points, the area covered by a particular camera may be defined. For example, camera na may be defined as covering azimuthal angular range 0 degrees to 60 degrees and elevational angular range 0 degrees to 60 degrees. The cameras 11 and controller 13 may form an integrated recording apparatus 10 wherein the bearing information is stored in the memory of the cameras 11 and/or controller 13. In alternative embodiments, the cameras 11 and/or controller 13 may be provided with a compass to determine direction and/or a gyroscope to determine orientation.

Figure 4:
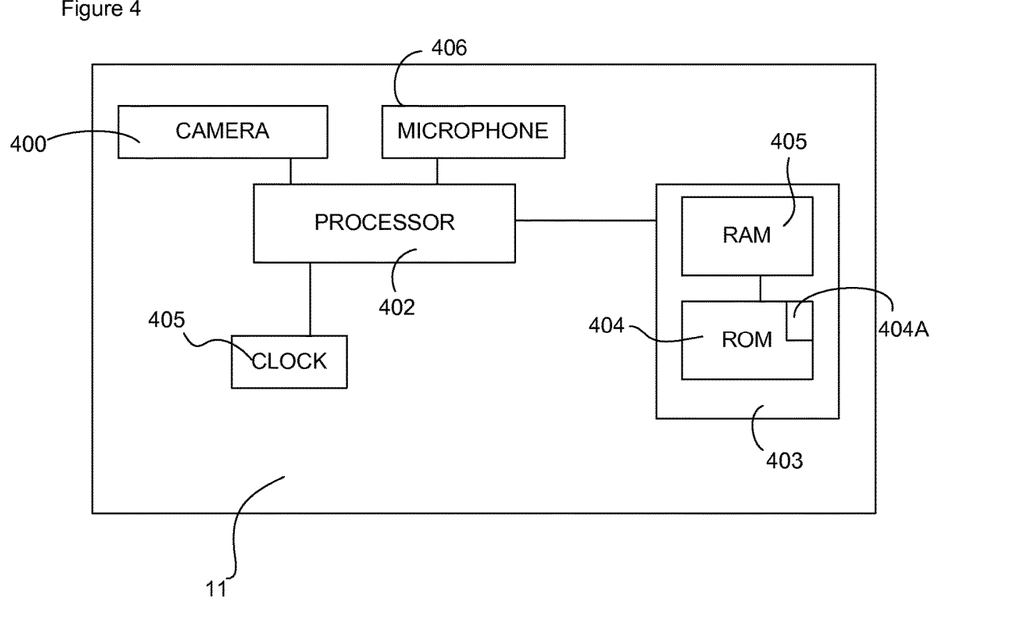
FIG. 4 is a schematic diagram of a camera.

FIG. 4 is a schematic block diagram of one of the cameras 11. The camera 11 comprises a camera module 400. The camera module 400 comprises video camera components that are known in the art including, for example a lens, a CCD array and an image processor. Each camera 11 may be controlled by the controller 13. In some embodiments, the camera 11 receives instructions from the communication module 14 which, in turn, receives instructions wirelessly from the video-editing computer. Alternatively, each camera 11 may be provided with an RF antenna and transceiver so that each controller receives instructions directly from and is controlled by the video-editing computer. The camera 11 also comprises a processor 402 and storage device 403. The storage device comprises non-volatile memory 404 and volatile memory 405. The non-volatile memory is provided with computer-readable instructions 404A. The camera may also be provided with a clock 405 so that a timeline may be applied to the recorded video content. The clocks of each of the cameras may be synchronised by the controller 13 to ensure that consistent timekeeping is applied. The camera 11 may also comprise a microphone 406 to capture audio content. The cameras may comprise separate video and audio processors. Alternatively, the video and audio processing capability may be combined in a single multimedia processor or, as shown in FIG. 4, the processing functionality of the camera module 400 and microphone 406 may be performed by the processor 402.

Figure 5:
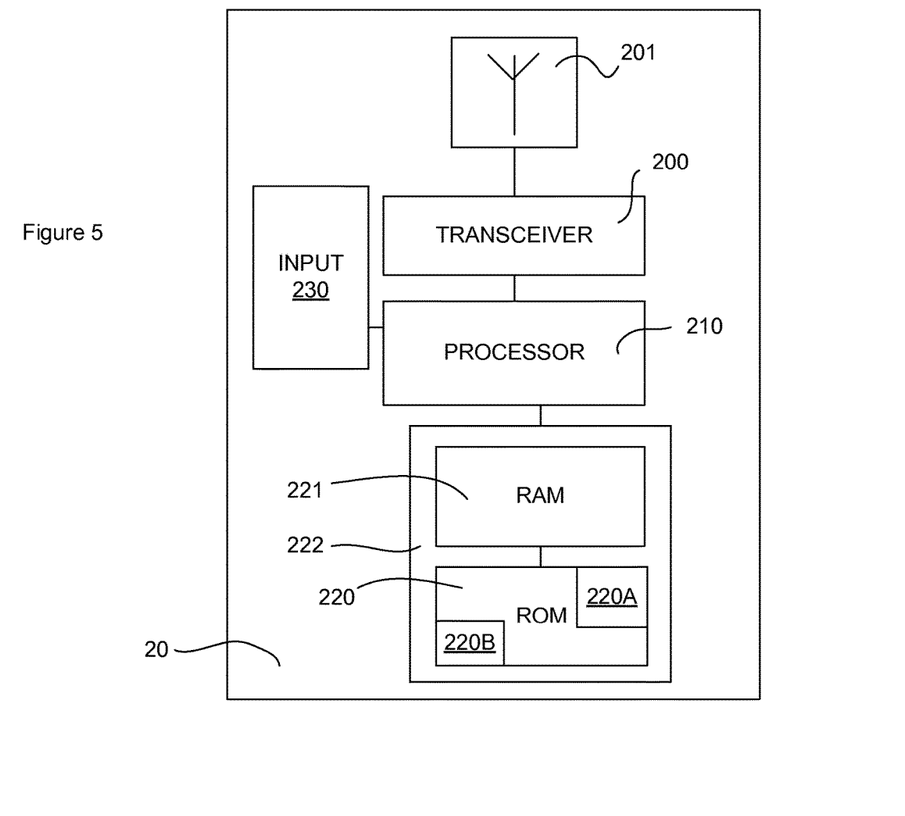
FIG. 5 is a schematic diagram of a mobile tag.

FIG. 5 is a schematic block diagram of the positioning tag 20. The positioning tag 20 comprises a transceiver 200 for transmitting wireless messages such as BLE advertisement messages and an antenna 201. The positioning tag 20 also comprises a processor 210 and a storage device 222. The storage device comprises non-volatile memory 220 and volatile memory 221. The non-volatile memory is provided with a Bluetooth module 220A and programming instructions 220B. The programming instructions 220B allow the particular functionality of the positioning tags 20 in embodiments of the present invention to be stored and executed. The Bluetooth module 220A contains the code required so that messages may be transmitted in accordance with the Bluetooth standard.

In some embodiments the positioning tag 20 may form a component of a mobile communication device such as a mobile phone, smart watch, electronic glasses etc. In this case, the mobile communication device may comprise an input 230 allowing a user to input additional information to be included in the wireless messages. For example, a user may include their name. Another example, where the positioning tag 20 is included as part of a smart watch or mobile phone is that a user may record their heartbeat which is then transmitted as a data field in the wireless message such as BLE advertisement messages.

Figure 6:
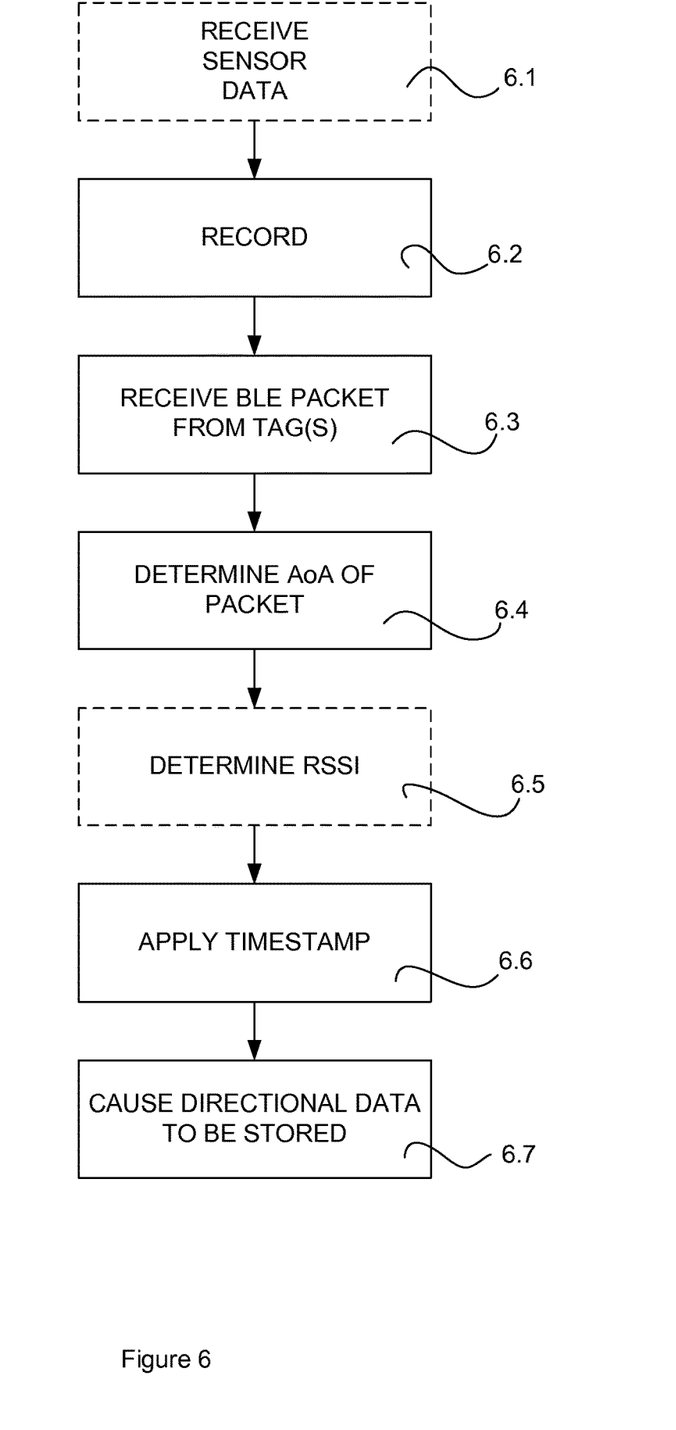
FIG. 6 is a flow chart illustrating a flow chart showing steps taken at a recording apparatus.

FIG. 6 is a flow chart illustrating operations of the recording apparatus 10 as a video is recorded.

At operation 6.1, the controller 13 may optionally collect information from positioning devices 20 in the vicinity of the recording apparatus 10. Positioning devices may send wireless messages containing sensor data advising the recording apparatus 10 of the presence of the positioning devices 20 in the vicinity. The wireless messages may contain sensor information about the positioning devices 20. Sensor information may include, for example, the identity of the user of the device, whether the device attached to the user (e.g. as a smart watch, electronic glasses etc). The collection of the sensor data via connection with the positioning devices 20 may also happen during the recording or after the recording.

There may also be multiple radio transceivers or capability for multiple connections in the controller 13, so that for example heart rate information of a competitor person can be recorded along taking video. The additional data may be saved into the same file as the directional or into separate file(s). An advantage of a separate file is faster search.

Search may be based, for example, on searching records related with a particular identity only.

At operation 6.2, recording is commenced. The instruction to commence recording may be inputted at a computer that is in wireless communication with the recording apparatus 10. Alternatively, the recording apparatus 10 may comprise input capability such as a record button, touchscreen and so forth. Video may be recorded by each of the cameras 11 for the entire sphere shown in FIG. 1. The video may be stored in a video file format such as .wmv, .mov or .mpeg or any other suitable format. The audio data may be recorded within the same data file as the video or in separate files. Examples of audio file formats are .wav and .mp3 although any other suitable file format may be used.

At operation 6.3, the recording apparatus 10 receives a wireless message from a positioning tag such as the positioning tag 20 shown in FIG. 1. The wireless message may contain an identifier to identify the positioning tag that sent the packet. The wireless message may also contain further fields such as text. For example, a message may contain heartbeat information obtained by the positioning tag 20.

At operation 6.4, the azimuthal and/or elevational Angles of Arrival are determined. Direction estimation of the signal source from the received signal is performed by using multiple antenna elements. The estimation of the azimuthal and elevational Angle of Arrival is based on measured time difference of signal copies (received by the multiple physically separated antenna elements 340, 350 shown in FIG. 3) in the controller 13. The time difference is due to variable propagation channel lengths, and the practical estimation is typically based on secondary effects to the signal, such as the resulting phase difference of the signal copies.

The positioning tag 20 transmits a wireless message and the controller 13 executes antenna switching during the reception of the packet. The controller 13 scans for the wireless messages and executes amplitude and phase sampling during reception of the packets. The controller 13 may then utilise the amplitude and phase samples, along with its own antenna array information, to estimate the AoA of the packet from the positioning tag 20.

Operation 6.5 is an optional step. The RSSI value of the received packet is determined and recorded. At operation 6.6, the received packet is time stamped. At operation 6.7, the data obtained at operations 6.4, 6.5 and 6.6 are stored. The data may be stored as part of the video file. Alternatively, the data may be stored in a separate file. Storing the data separately is advantageous since it is not reliant on video formats that support adding the data to video file metadata.

Table 1 shows an example of the contents of a directional data file.

| Time | Elevation angle | Azimuth angle | Identity | RSSI | Data |
|---|---|---|---|---|---|
| 00:00:134 | 176° | 281° | 00:01:02:03:04:05 | −73 dBm | 01:22:34:56 |
| 00:01:023 | 183° | 32 [ | 00:01:02:03:04:05 | −76 dBm | 01:22:34:56 |
| 00:01:345 | 70° | 355 L | 11:01:02:03:04:05 | −50 dBm | 01:22:34:57 |
| 00:02:576 | 165° | 101 | | 00:01:02:03:04:05 | −73 dBm | 01:22:34:56 |
| 00:03:258 | 163° | 23 [ | 00:01:02:03:04:05 | −67 dBm | 01:22:34:56 |
| 00:03:753 | 65° | 174 [ | 11:01:02:03:04:05 | −54 dBm | 01:22:34:57 |
| 00:03:915 | 3° | 110 ]] | 22:01:02:03:04:05 | −88 dBm | 01:22:34:58 |
| 00:04:097 | 154° | 303 | | 00:01:02:03:04:05 | −79 dBm | 01:22:34:56 |
| 00:04:349 | 61° | 224 [ | 11:01:02:03:04:05 | −56 dBm | 01:22:34:57 |
| 00:04:436 | 7° | 197 [ | 22:01:02:03:04:05 | −82 dBm | 01:22:34:58 |

The example directional data comprises an identifier of the transmitter of the detected directional signals (i.e. the positioning tag 20), the measured azimuthal and elevational angles and RSSI values. Each angle and corresponding RSSI value is associated with a time stamp. The time stamp applied to the received directional data packet corresponds to the video recording so that the observed tag can be matched with the video stream.

The file contents shown in Table 1 illustrate embodiments where wireless messages received from tags 20 positioned anywhere within the spherical space surrounding the recording apparatus 10 (i.e. from 0 to 360 degrees in both azimuth and elevation) are recorded in a single file. This may be the case where a single controller 13 is used in connection with each camera 11. In other embodiments, each camera 11 may be connected to a respective controller 13 and a file containing data relating to tag detection events in the sector recorded by the camera may be maintained at each controller. Alternatively, a single file containing data relating to tag detection may be compiled by a central processor (such as the video editing computer) based on files of tag data relating to each sector of the spherical space surrounding the recording apparatus 10.

The directional information from controller and the camera information are recorded so that transmitters can be placed into the combined camera recording (360 degree recording). The controller may collect data from all or the subset of the received packets.

The link between the portions of the video/audio data and the directional data may be based on setting a relationship between the directional radio sphere and the video/audio recording sphere to match. Each camera records a certain part of the video sphere—the parts of sphere the cameras cover may be overlapping. In various embodiments, the is cameras are arranged so there are no gaps in coverage. The part of the sphere that a camera covers is matched with certain part of the radio/directional sphere. When the desired radio transmitter is detected on certain azimuth and elevation angles, the corresponding camera/cameras can be switch on or their focus can be adjusted according to the radio/directional detection.

Figure 7:
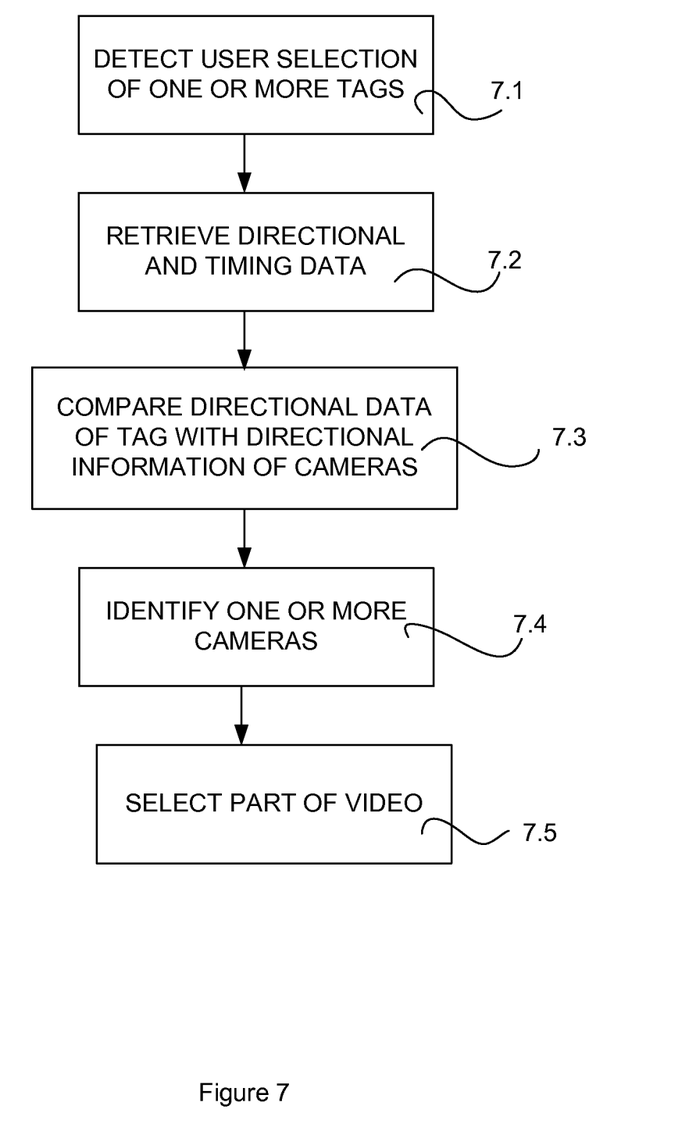
FIG. 7 is a flow chart illustrating a flow chart showing steps taken at a replay apparatus.

FIG. 7 shows the operations performed when a user wishes to replay and edit video content. The video content may be being live-streamed on a screen of the recording apparatus 10, in which case, the following steps shown in FIG. 7 are performed at the recording apparatus 10. Alternatively, the video content may be being live-streamed on a screen of the replay apparatus 15 in which case, the following steps shown in FIG. 7 are performed at the replay apparatus 15.

In alternative embodiments, the content may be stored locally at the replay apparatus 15, at the recording apparatus 10 or at the remote server 170 for playback subsequent to the recording of the video content. The selected video content may be played back on the replay apparatus 15 or at the recording device 10.

In this example, the recording apparatus 10 has captured video content across a spherical recording area. The resulting data size of a video stream containing video content from the array of cameras shown in FIG. 1 can be very large. During the replay and editing stages, a user may choose to watch video based on a direction of the particular tag. By matching the video content captured from the various cameras with the directional data relating to the tags of interest, the amount of video data that needs to be handled can be reduced.

At operation 7.1, a user selects one or more positioning tags 20 that he or she wants to track during playback of the video content. This may be done in a number of ways. For example, the user may be presented with a user interface in which a list of tags is displayed. The tags that are selected for display may be obtained from the directional data file 156 which contains the tag identifiers, displayed to the user who then selects at least one tag to track.

At operation 7.2, the replay apparatus 15 or recording apparatus 10 searches the directional data file 156 for the directional data and time stamp data relating to the selected positioning tags 20. The directional data and time stamp data relating to the selected positioning tags 20 are retrieved.

At operation 7.3, the replay apparatus 15 compares the directional data of the selected tag 20 with directional information regarding each of the cameras 11. At operation 7.4, one or more cameras are identified that have recorded video content from a section of the spherical recording area that corresponds to the location of the selected tag.

At operation 7.5, part of the video content is selected containing the video content from the identified one or more cameras and the video content from the one or more cameras 11 is retrieved. The timestamp data may be analysed and compared to the timeline of video content of a particular camera so that video content is only retrieved for the time periods in which the positioning tag is in the area recorded by a particular camera.

The parts of the content selected at step 7.5 may then be displayed to a user. In some embodiments, a user may select more than one positioning tag to be displayed. If it is determined that the user selected positioning tags that are covered by separate cameras, the tags may be displayed simultaneously in a split screen format. In one example, ice hockey players are wearing wearable positioning tags. A user selects two ice hockey players to be viewed. If it is determined that the two players are not covered by the same camera then the two players may be displayed in a split-screen format.

As well as retrieving video content data from cameras covering the area in which the selected tags are located, video content data may also be obtained from cameras adjacent to the camera covering the area in which the selected tags are located. This is useful where a tag is highly mobile and may move quickly from one section of the video sphere to an adjacent section.

In scenarios where the positioning tag which is selected by the user moves between various sectors of the video sphere, video content data may be retrieved only from the cameras that are covering the areas in which the tag is located over a period of time. As such, video content data from cameras that do not cover areas in which the tag is located does not need to be accessed.

Embodiments of the invention allow the video/audio and radio-direction records to be used to enable viewing or downloading of only a portion of the recorded material. The radio-direction information may be based on detection of a transmitter that is attached to an object (e.g. person, animal or device). Therefore, a video/audio record focus area can be chosen based on choosing the desired radio transmitter identity and other data received from the positioning tags 20. As the user decides which of the radio signal objects he or she wants to follow, this object (and its near surroundings) can be streamed for high quality by, for example, increasing the bit rate for cameras that are covering the tag. Other tags or directions can be streamed with lower quality to save bandwidth and thus improve streaming capability. Furthermore, video streams from cameras not showing the selected tags may not be downloaded or streamed at all, further saving bandwidth.

A video record of a particular object at a particular time can be searched and viewed efficiently using the identifier and the directional information related with the object. The searching speed may be increased by using a separate, light-weight file to store the records of the directional information. Alternatively, the directional information may be stored as part of the video file.

Figure 9:
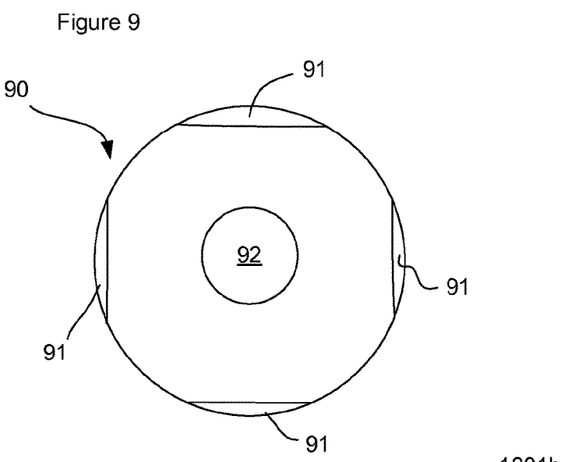
FIG. 9 shows a camera array according to an alternative embodiment.

FIG. 9 shows a recording apparatus 90 according to an alternative embodiment. The recording apparatus 90 comprises a circular array of recording devices. In general, the operation of the recording apparatus 90 is similar to that of the recording apparatus 10. However, the circular array is arranged in a single plane so that each of the cameras 91 is arranged to capture a section of the three-dimensional space surrounding the camera array 90. An example of a camera array capable of producing video recordings around 360 degrees is the GoPro 360 camera array. Such an arrangement is advantageous in scenarios where the region to be recorded lies within the recording area of a circular array of cameras. It should be borne in mind that single plane arrays may cover partial circle, for example a semicircle.

Table 2 shows an example file that may be compiled during detection of positioning tags.

TABLE 2

| Time | Azimuth angle | Identity | RSSI | Data |
| --- | --- | --- | --- | --- |
| 00:00:134 | 281° | 00:01:02:03:04:05 | −73 dBm | 01:22:34:56 |
| 00:01:023 | 32° | 00:01:02:03:04:05 | −76 dBm | 01:22:34:56 |
| 00:01:345 | 355° | 11:01:02:03:04:05 | −50 dBm | 01:22:34:57 |
| 00:02:576 | 101° | 00:01:02:03:04:05 | −73 dBm | 01:22:34:56 |
| 00:03:258 | 23° | 00:01:02:03:04:05 | −67 dBm | 01:22:34:56 |
| 00:03:753 | 174° | 11:01:02:03:04:05 | −54 dBm | 01:22:34:57 |
| 00:03:915 | 110° | 22:01:02:03:04:05 | −88 dBm | 01:22:34:58 |
| 00:04:097 | 303° | 00:01:02:03:04:05 | −79 dBm | 01:22:34:56 |
| 00:04:349 | 224° | 11:01:02:03:04:05 | −56 dBm | 01:22:34:57 |
| 00:04:436 | 197° | 22:01:02:03:04:05 | −82 dBm | 01:22:34:58 |

Since all of the cameras 91 are located in the same plane, there is no requirement to collect elevational angle information. As such, the file has a smaller data size. The controller 92 comprised within the recording apparatus 90 need only perform angle of arrival calculations to determine an azimuthal angle. Therefore, the processing required by the controller is lower than in the case where the elevational angle is also determined.

Figure 10:
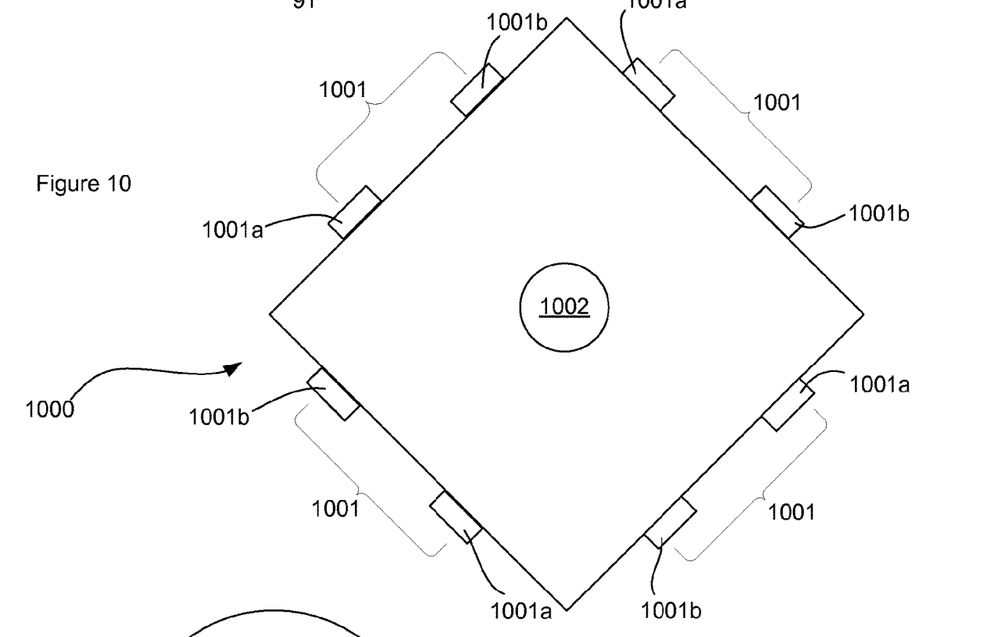
FIG. 10 shows a camera array according to an alternative embodiment.

FIG. 10 shows a recording apparatus moo according to yet another alternative embodiment. The recording apparatus moo comprises an array of camera pairs 1001. Each camera pair 1001 comprises a first camera loom and a second camera 1002b. The first camera loom is configured to capture a left-eye image and the second camera 1002b is configured to capture a right-eye image. The recording apparatus moo comprises a controller to combine the left-eye image with the right-eye image to form a stereoscopic image. It will be appreciated that the processing involved in forming stereoscopic videos is relatively intensive since images must be captured from both cameras of each pair 1001. Subsequent editing of stereoscopic videos is also relatively intensive in terms of processing. The array of camera pairs may be spherical or circular. For a spherical array both elevational and azimuthal data may be recorded. For a circular array only azimuthal data may be recorded.

In this embodiment, storage of directional data is performed in largely the same way as previously described.

The controller 1002 may store reference values to allow the azimuthal angle (and, in the case of a spherical array, elevational angle) to be monitored uniformly. The control module may store information defining the bearing of zero degrees in azimuth and elevation. From these reference points, the area covered by a particular camera pair may be defined. For example, a first camera pair may be defined as covering azimuthal angular range 0 degrees to 60 degrees and elevational angular range 0 degrees to 60 degrees. The cameras pair and controller 1002 may form an integrated recording apparatus wherein the bearing information is stored in the memory of the cameras and/or controller 1002. In alternative embodiments, the cameras and/or controller 1002 may be provided with a compass to determine direction and/or a gyroscope to determine orientation.

Advantages of various embodiments, especially where the camera array is arranged to record stereoscopic video content, include the ability to manage feeds having high resolutions. For example, cameras in the arrays described above may have a resolution of up to approximately 6K. When editing the feeds from the different cameras it may be necessary to switch between several high bandwidth feeds. This is especially true, in embodiments having a stereoscopic camera array involving pairs of cameras. Switching between a large number of feeds at a replay apparatus 15 becomes very demanding in terms of bandwidth. Furthermore, if feeds are stored at a remote server and accessed remotely by the replay apparatus 15 over a wireless connection then switching between a large number of feeds may become difficult in terms of bandwidth management and cost. Embodiments provide an advantage that the number of feeds that need to be retrieved can be kept to a minimum.

Figure 8:
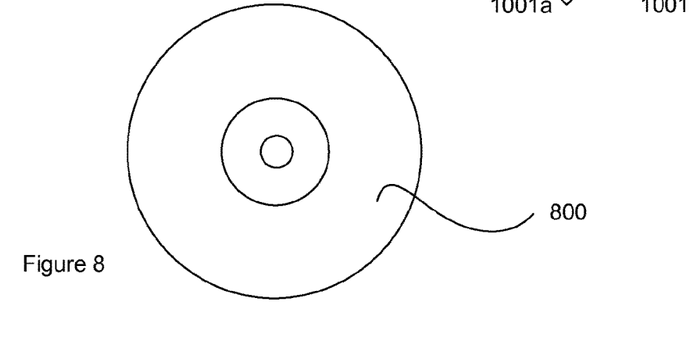
FIG. 8 shows a storage medium.

Computer readable instructions, software and operating systems may be pre-programmed into the apparatuses 11, 13, 14, 15, 20, 92, 1002. Alternatively, the computer readable instructions, software and operating systems may arrive at the apparatuses 11, 13, 14, 15, 20, 92, 1002 via an electromagnetic carrier signal or may be copied from a physical entity 800 (see FIG. 8) such as a computer program product, a memory device or a record medium such as a CD-ROM or DVD. The computer readable instructions, software and operating systems may provide the logic and routines that enables the devices/apparatuses 11, 13, 14, 15, 20, 92, 1002 to perform the functionality described above.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Embodiments of the present disclosure may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present disclosure, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

By way of example, and not limitation, such "computer-readable storage medium" may mean a non-transitory computer-readable storage medium which may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that "computer-readable storage medium" and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of "computer-readable medium".

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

If desired, the different steps discussed herein may be performed in a different order and/or concurrently with each other. Furthermore, if desired, one or more of the above-described steps may be optional or may be combined.

Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The invention claimed is:

1. A method comprising:
capturing, at a video capture apparatus, video content obtained from an array of cameras, wherein the array of cameras is one of a circular array of cameras arranged to provide video coverage of a recording area surrounding the circular array of cameras across 360 degrees in terms of azimuth, or a spherical array of cameras arranged to provide video coverage of a recording area surrounding the spherical array of cameras across 360 degrees in terms of both azimuth and elevation, wherein each camera is arranged to capture video content from a different section of the recording area defined by directional data associated with each camera, and wherein for the circular array of cameras the directional data comprises a section of the 360 degrees in terms of azimuth, and for the spherical array of cameras the directional data comprises a section of the 360 degrees in terms of azimuth and elevation;
receiving a wireless message comprising a BLE advertisement packet, from a tag situated in the recording area;
applying a time stamp to the received wireless message;
determining directional information of the tag in the recording area based on analysis of the wireless message, wherein the directional information comprises at least one of an azimuthal angle or an elevational angle;
causing the directional information and the timestamp to be stored;
detecting a user selection of the tag;
causing the stored directional information of the selected tag and the timestamp to be retrieved;
comparing the retrieved directional information of the selected tag with directional data associated with each of the cameras;
identifying, based on the comparison, a camera that has captured video content from a section of the recording area that corresponds to the retrieved directional information of the selected tag; and
comparing the retrieved timestamp with a timeline of the captured video content to retrieve video content only for a time period in which the selected tag is in a section of the recording area that corresponds to the retrieved directional information of the selected tag.

2. The method of claim 1, wherein the directional information comprises angle of arrival information of the received wireless message.

3. The method of claim 2, wherein the angle of arrival information comprises at least one of:
a) an azimuthal angle,
or
b) an elevational angle,
or
c) contains a tag identifier identifying the tag from which the wireless message is received,
or
d) wherein the timestamp corresponds to a time value of the captured video content.

4. The method of claim 3, wherein the directional information and timestamp information are stored in a file separate from the captured video content.

5. The method of claim 3, wherein the video content captured by each respective camera is recorded as part of a composite data file or in an individual file.

6. The method of claim 3, wherein the array of cameras comprises a plurality of stereoscopic camera pairs.

7. The method of claim 1, wherein the directional information and the timestamp data are stored in at least one of:
a) the video capture apparatus,
or
b) a remote server.

8. The method of claim 1, wherein the wireless message contains additional information input by a user of the tag.

9. The method of claim 1, wherein the array of cameras is a spherical array of cameras arranged to provide video coverage of an area surrounding the spherical array of cameras across 360 degrees in terms of both azimuth and elevation, and wherein the directional information comprises an azimuthal angle and an elevational angle.

10. The method of claim 1, further comprising increasing the bit rate of the identified camera while decreasing the bit rate of other cameras in the array of cameras.

11. Apparatus comprising:
at least one processor;
at least one memory having computer-readable instructions stored thereon, the computer-readable instructions when executed by the at least one processor causing the apparatus at least to:
capture video content obtained from an array of cameras, wherein the array of cameras is one of a circular array of cameras arranged to provide video coverage of an a recording area surrounding the circular array of cameras across 360 degrees in terms of azimuth, or a spherical array of cameras arranged to provide video coverage of an a recording area surrounding the spherical array of cameras across 360 degrees in terms of both azimuth and elevation, and wherein each camera is arranged to capture video content from a different section of the recording area defined by directional data associated with each camera, and wherein for the circular array of cameras the directional data comprises a section of the 360 degrees in terms of azimuth, and for the spherical array of cameras the directional data comprises a section of the 360 degrees in terms of azimuth and elevation;
receive a wireless message comprising a BLE advertisement packet, from a tag situated in the recording area;
apply a time stamp to the received wireless message;

determine directional information of the tag in the recording area based on analysis of the wireless message, wherein the directional information comprises at least one of an azimuthal angle or an elevational angle;
cause the directional information and the timestamp to be stored;
detect a user selection of the tag;
cause the stored directional information of the selected tag and the timestamp to be retrieved;
compare the retrieved directional information of the seected tag with directional data associated with each of the cameras;
identify, based on the comparison, a camera that has captured video content from a section of the recording area that corresponds to the retrieved directional information of the selected tag; and
compare the retrieved timestamp with a timeline of the captured video content to retrieve video content only for a time period in which the selected tag is in a section of the recording area that corresponds to the retrieved directional information of the selected tag.

12. The apparatus of claim 11, wherein the directional information comprises angle of arrival information of the received wireless message.

13. The apparatus of claim 12, wherein the angle of arrival information comprises at least one of the following:
a) an azimuthal angle,
or
b an elevational angle,
or
c) contains a tag identifier identifying the tag from which the wireless message is received
or
d) wherein the timestamp corresponds to a time value of the captured video content.

14. The apparatus of claim 11, wherein the directional information and the timestamp are stored are stored at least one of:
a) at the apparatus,
or
b) are stored at a remote server.

15. The apparatus of claim 11, wherein the wireless message contains additional information input by a user of the tag.

16. The apparatus of claim 11, wherein the directional information and timestamp information are stored in a file separate from the captured video content.

17. The apparatus of claim 11, wherein the video content captured by each respective camera is recorded as part of a composite data file or in an individual file.

18. The apparatus of claim 11, wherein the array of cameras comprises a plurality of stereoscopic camera pairs.

19. The apparatus of claim 11, wherein the array of cameras is a spherical array of cameras arranged to provide video coverage of an area surrounding the spherical array of cameras across 360 degrees in terms of both azimuth and elevation, and wherein the directional information comprises an azimuthal angle and an elevational angle.

20. A non-transitory computer-readable storage medium having computer-readable code stored thereon, the computer-readable code, when executed by at least one processor, causing performance of:
capturing, at a video capture apparatus, video content obtained from an array of cameras, wherein the array of cameras is one of a circular array of cameras arranged to provide video coverage of a recording area surrounding the circular array of cameras across 360 degrees in terms of azimuth, or a spherical array of cameras arranged to provide video coverage of a recording area surrounding the spherical array of cameras across 360 degrees in terms of both azimuth and elevation, wherein each camera is arranged to capture video content from a different section of the recording area defined by directional data associated with each camera, and wherein for the circular array of cameras the directional data comprises a section of the 360 degrees in terms of azimuth, and for the spherical array of cameras the directional data comprises a section of the 360 degrees in terms of azimuth and elevation;
receiving a wireless message comprising a BLE advertisement packet, from a tag situated in the recording area;
applying a time stamp to the received wireless message;
determining directional information of the tag in the recording area based on analysis of the wireless message, wherein the directional information comprises at least one of an azimuthal angle or an elevational angle;
causing the directional information and the timestamp to be stored;
detect a user selection of the tag;
cause the stored directional information of the selected tag and the timestamp to be retrieved;
compare the retrieved directional information of the selected tag with directional data associated with each of the cameras;
identify, based on the comparison, a camera that has captured video content from a section of the recording area that corresponds to the retrieved directional information of the selected tag; and
compare the retrieved timestamp with a timeline of the captured video content to retrieve video content only for a time period in which the selected tag is in a section of the recording area that corresponds to the retrieved directional information of the selected tag.

21. The non-transitory computer-readable storage medium of claim 20, wherein the array of cameras is a spherical array of cameras arranged to provide video coverage of an area surrounding the spherical array of cameras across 360 degrees in terms of both azimuth and elevation, and wherein the directional information comprises an azimuthal angle and an elevational angle.

* * * * *